Nov. 7, 1933.  G. BOULTON  1,933,583
TRIMMING MACHINE
Filed Aug. 10, 1932  2 Sheets-Sheet 1
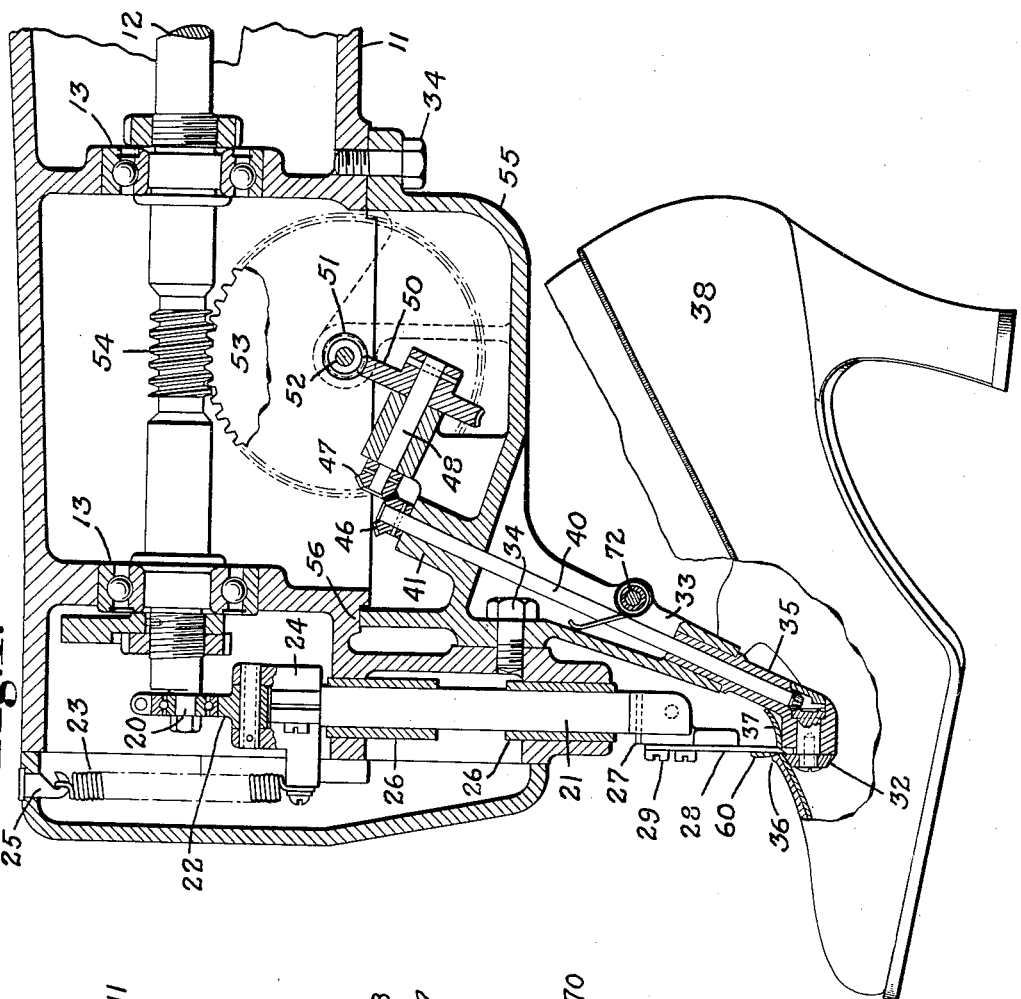
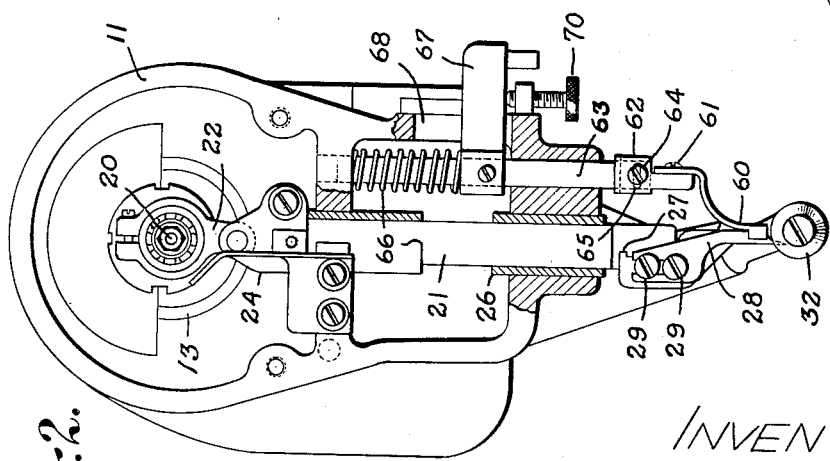

Nov. 7, 1933.  G. BOULTON  1,933,583
TRIMMING MACHINE
Filed Aug. 10, 1932  2 Sheets-Sheet 2
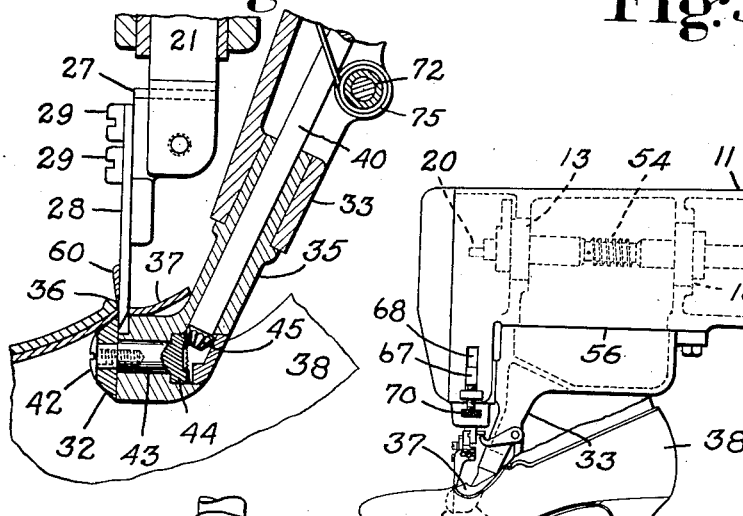
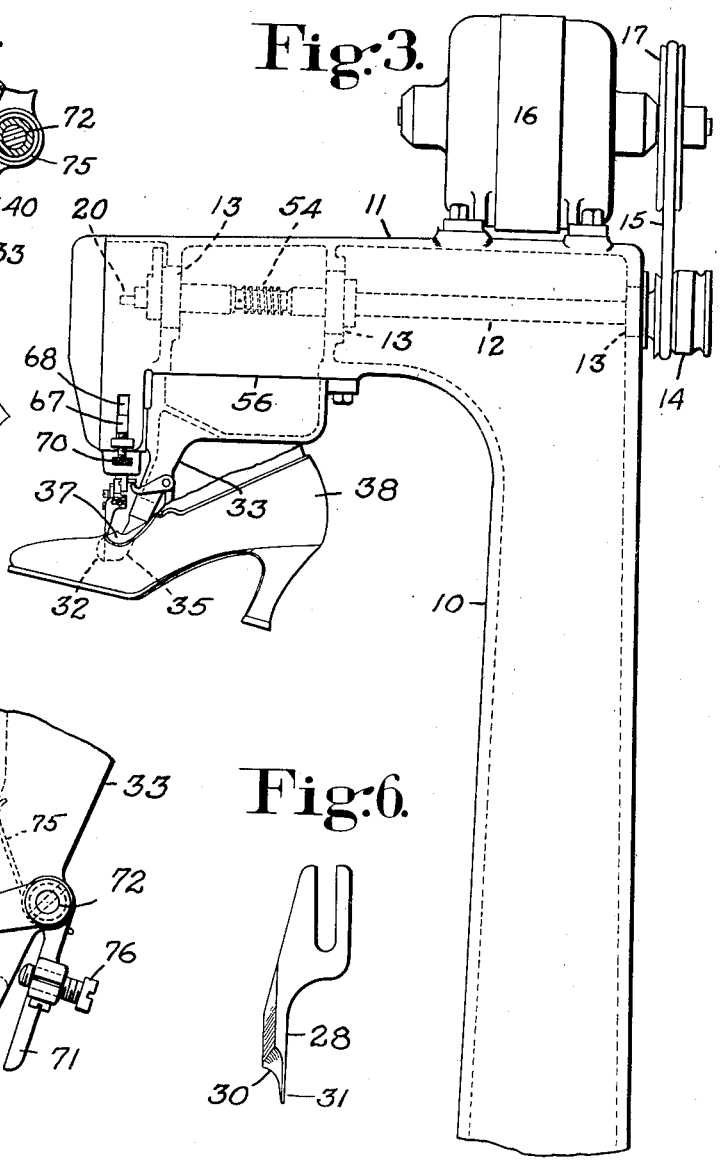
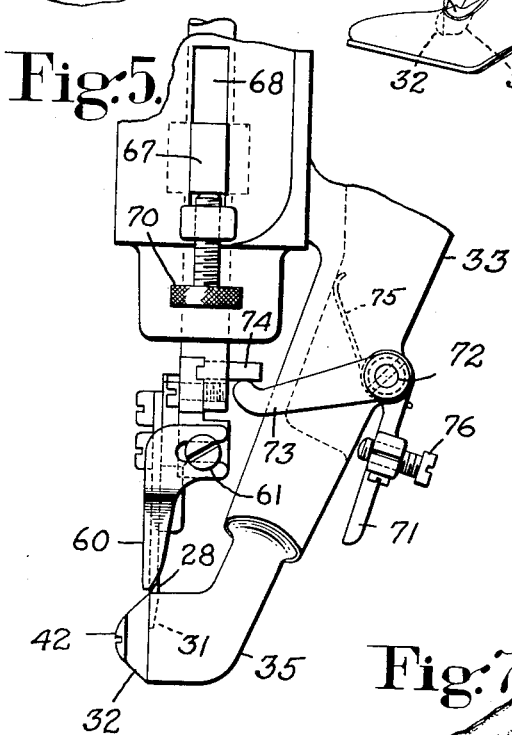
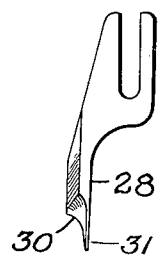
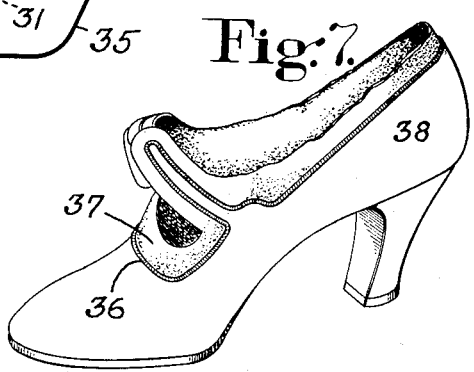
INVENTOR
George Boulton
By his Attorney
Harlow M. Davis Patented Nov. 7, 1933

1,933,583

UNITED STATES PATENT OFFICE 1,933,583

TRIMMING MACHINE

George Boulton, Rochester, N. Y., assignor to United Shoe Machinery Corporation, Paterson, N. J., a corporation of New Jersey Application August 10, 1932. Serial No. 628,243

5 Claims. (Cl. 12—51)

This invention relates to trimming machines and is herein illustrated as embodied in a machine of the same general type as that disclosed in reissued Letters Patent of the United States No. 17,112, granted October 23, 1928 on application of A. C. Smith. The duty for which such machines are chiefly used is to cut off projecting margins of lining material in low shoes, more especially pumps and strap-shoes for women.

For reasons well understood by manufacturers of such shoes it is the general practice to make the shoes with surplus lining material of soft leather that projects from the finished edges of the uppers, and to trim off such surplus material flush with the finished edges after the shoes are otherwise completed. If the shoes are provided with straps these too are commonly lined and require flush trimming of the surplus lining material.

As heretofore constructed, machines for performing the lining-trimming operation above described have been provided, as exemplified in said Reissue Patent No. 17,112, with two cooperative shearing cutters, one of which reciprocates at high speed, and the other of which is circular and freely rotatable. When both cutters are new and sharp they fulfill all requirements and produce entirely satisfactory results, but when, as sometimes happens, the circular cutter remains in one position too long a shallow groove may be worn in it by the rubbing action of the reciprocatory cutter. Consequently, the cutting edge of the circular cutter becomes wavy or irregular instead of lying all in one plane, and its cutting effect is impaired.

To overcome this condition an object of the present invention is to provide an improved trimming machine of the type described that will insure rotation of the circular cutter so long as the reciprocatory cutter is in motion, and at the same time afford ample space for the passage of the counter-portion of a high-heeled shoe while the cutters are operating on the throat of the vamp. One prior type of trimming machine comprising a rotary circular shearing cutter with which a reciprocatory cutter cooperates is provided with a train of mechanism for positively driving the rotary cutter, but in machines of that type the operating connections for transmitting rotation to the circular cutter occupy the space that should be clear and unobstructed for the passage of the counter-portions of shoes. Consequently, the utility of such machines is limited to shoes, for example rubber shoes, that are so limp and pliable as to be easily capable of being greatly distorted by bending down their shank-portions and flexing their counter-portions to clear the operating connections. On the other hand, leather shoes having stiff shanks and stiff counter-portions cannot be distorted in any way that would enable the machines to trim their linings along the throats of the vamps.

Therefore, in accordance with the object above stated, the machine herein illustrated is provided with a stationary hanger the lower end of which is formed and arranged to hang in the forepart of a high-heeled low shoe of which the counter-portion is held above the level of the throat of the vamp, a small circular shearing cutter being mounted at the lower end of the hanger and arranged to rotate about a horizontal axis, a power-operated cutter arranged in shearing relation to the circular cutter to sever surplus shoe-lining, and power-operated means extending downwardly through the hanger to drive the circular cutter.

Preferably, and as herein shown, the mechanism for driving the circular cutter is designed to turn that cutter at a speed much slower than the speed at which the operator feeds the work, but nevertheless fast enough to distribute the wear of the circular cutter evenly. For example, the speed of the circular cutter may be less than one revolution per minute in a machine in which the other cutter is reciprocated at a speed of about 5,000 cycles per minute. Consequently, although the circular cutter may have a slight degree of tractive effect on the work its rotational movement is not sufficient to produce any appreciable movement of the work when the operator momentarily interrupts the feeding movement thereof, as when, for example, the trimming cut encounters an angle in the work.

Referring to the drawings,

Fig. 1 is a vertical section of a portion of a head of a trimming machine constructed in accordance with this invention;

Fig. 2 is an end elevation, partly in section, of the structure included in Fig. 1, the front cap or cover section of the frame being removed to expose the parts normally concealed thereby;

Fig. 3 is an elevation on a smaller scale of the upper part of the machine, the direction of view being the same as that of Fig. 1;

Fig. 4 is a vertical section on a larger scale including the cutter and adjacent parts, the direction of view being the same as that of Fig. 1;

Fig. 5 is an elevation of the parts adjacent to the trimming locality;

Fig. 6 is an elevation of the reciprocatory cutter; and

Fig. 7 illustrates a typical example of a high-heeled low shoe the lining of which requires trimming.

The illustrated machine is designed to stand on a floor and comprises a base (not shown), a column or standard 10 extending upwardly from the base, and a hollow head 11 extending horizontally from the upper end of the column 10. A high-speed, horizontal operating shaft 12 enclosed in the head 11 is journaled in bearings 13 and is provided with a pulley 14 at its rear end for a driving belt 15. An electric motor 16 mounted on the head 11 is provided with a driving pulley 17 by which the belt 15 is driven. By this means, the shaft 12 is driven at a speed of about 5000 R. P. M.

A crank or wrist-pin 20 at the left-hand end of the shaft 12 reciprocates a vertical cutter-bar 21 to which it is connected by a link or pitman 22. Preferably, a helical tension spring 23 is connected to the cutter-bar 21 by a member 24, the upper end of the spring being attached to the frame by a hook 25. The purpose of the spring is to counteract the weight of the cutter-bar 21 and the parts carried thereby, to the end that the load on the crank or wrist-pin 20 will be approximately balanced. The cutter-bar 21 slides in bearings 26 in the head 11, and its lower end is provided with a horizontally adjustable block 27 to which a flat blade or cutter 28 is affixed by screws 29. The cutter 28 is provided with a cutting edge 30 (Fig. 6) and with a short pilot 31 projecting downwardly therefrom.

A small circular cutter 32 is supported below and in shearing relation to the cutter 28 by a hanger detachably affixed to the head 11 by bolts 34. The hanger comprises a bowl-shaped oil-container 55, a depending arm portion 33 integral therewith, and a bushing 35 constituting an extension of the portion 33. The lower end of the hanger is so far below the bowl-shaped portion 55 that it may hang in the forepart of a high-heeled low shoe of which the counter-portion is held above the level of the throat of the vamp as illustrated in Figs. 1 and 3, thus providing a clear, unobstructed space for the passage of the counterportion under the bowl-shaped portion 55 when the surplus shoe lining projecting from the throat of the vamp is presented to the cutters. A typical high-heeled low shoe, such as that illustrated in Fig. 7, is represented in Figs. 1 and 3 to show in which locality the counter-portion of such a shoe must have clearance when the cutters of a lining-trimming machine are trimming the surplus lining projecting from the throat of the vamp. In these figures, the finished edge of the upper at the throat of the vamp is indicated at 36, the surplus lining material projecting therefrom is indicated at 37, and the counter-portion of the shoe is indicated at 38.

To transmit rotation to the circular cutter 32 without obstructing the space necessary for the passage of the counter-portion of a shoe, the machine is provided with power-operated gearing arranged in the bowl-shaped member 55 and with a transmission shaft 40 extending downwardly therefrom and through the hanger, the upper portion of the shaft being journaled in a bearing 41 while the lower portion is journaled in the bushing or extension 35 of the hanger. The circular cutter 32 is affixed by a screw 42 to a short horizontal shaft or stem 43 journaled in the extension 35 and provided with a bevel gear 44 that engages a bevel gear 45 on the shaft 40. Because of the restricted dimensions of these parts the teeth constituting the bevel gears 44 and 45 are preferably integral portions of the shafts. As illustrated in Fig. 1 rotation for driving the circular cutter 32 is taken from the high-speed shaft 12 and so greatly reduced in transmission that the circular cutter 32 will be rotated at a speed much too slow for work-feeding purposes. The upper end of the shaft 40 is provided with a bevel gear 46 that receives rotation from a bevel gear 47 carried by a shaft 48. This shaft is journaled in the bowl-shaped member 55 and carries a worm-wheel 50 that receives rotation from a worm 51. This worm is carried by a horizontal shaft 52 also journaled in the bowl-shaped member 55. A worm-wheel 53 affixed to the shaft 52 is driven by a worm 54 cut on the main operating shaft 12. Thus, although the worm 54 rotates at a speed of about 5000 R. P. M., the circular cutter 32 is driven at a speed less than one revolution per minute, one reduction in speed being effected by the worm 54 and the worm-wheel 53, a second reduction being effected by the worm 51 and the worm-wheel 50, and a third reduction being effected by the bevel gears 45 and 44.

When the bowl-shaped member 55 is bolted to the head 11 it closes the opening 56 through which the speed-reducing gearing is inserted into the head. Both worm-wheels 50 and 53 are arranged in the hollow of the bowl-shaped member and may be immersed in lubricating oil contained in that member. Moreover, whenever the bowl-shaped member is detached it carries with it and maintains intact in their cooperative relations all the elements for transmitting rotation from the primary worm 54 to the circular cutter 32.

The illustrated machine is also provided with a trimming gage 60 that functions in the manner set forth in said Reissue Patent No. 17,112. The lower end of the gage is a thin blade and lies against one face of the reciprocatory cutter 28 a short distance above the upper edge of the circular cutter 32. The space between the lower edge of this gage and the circular cutter should be slightly more than the thickness of the lining material to be severed but not so great as the combined thickness of the lining material and the finished edge of the shoe upper. In practice, when the finished edge 36 of the shoe upper runs on the gage and is thereby guided it cannot intersect the plane of the trimming cut but will be so close to that plane that the surplus lining material 37 projecting therefrom will be trimmed substantially flush with the finished edge. In fact, it is possible, as a result of raising the counter portion of the shoe well above the level of the trimming locality, as illustrated in Figs. 1 and 3, to undercut the lining at the throat of the vamp.

The upper end of the trimming gage is affixed by a screw 61 to a horizontally adjustable member 62 carried by a vertically movable plunger 63 and connected thereto by a clamping screw 64, the member 62 being provided with a horizontal slot 65 through which the shank of the screw 64 extends. This adjustment provides for locating the lower end of the gage in the desired relation to the cutters.

The trimming gage is normally depressed by a compression spring 66 surrounding the plunger 63 and bearing downwardly on a lug 67 affixed to the plunger. The lug projects radially from the plunger through a vertical slot 68 formed in the head 11, the width of the slot being only wide enough to permit the lug 67 to play up and down therein. The lower limit of movement of the trimming gage may be regulated by an adjusting screw 70 against which the lug 67 is normally seated, but the trimming gage may be raised manually, whenever necessary, to clear a seam or other relatively thick portion of the shoe lining. For this purpose, the machine is provided with a finger-lever 71 (Fig. 5) affixed to a rock-shaft 72. The rock-shaft is journaled in a bearing in the part 33 of the hanger and is provided with an arm 73 arranged to underlie a lug 74 projecting horizontally from the plunger 63. A torsion spring 75 surrounds the rock-shaft 72 and is arranged to maintain the arm 73 normally in engagement with the lug 74, but the applied force of the spring 75 is not sufficient to raise the plunger 63 against downward stress of the spring 66. Nevertheless, a slight pressure of the operator's finger against the lever 71 is sufficient to raise the trimming gage. Preferably the finger-lever 71 is provided with an adjustable stop-screw 76 arranged to abut against the hanger 33 to limit the range of lifting movement of the lever so that the trimming gage will not be accidentally raised so far as to permit the finished edge of a shoe-upper to pass under it.

Having thus described my invention, what I claim as new and desire to secure by Letters Patent of the United States is:—

1. A trimming machine comprising a frame having a stationary hanger the lower end of which is formed and arranged to hang in the forepart of a shoe of which the counter-portion is held above the level of the throat of the vamp, a small circular shearing cutter mounted at the lower end of said hanger and arranged to rotate about a horizontal axis, a power-operated cutter arranged in shearing relation to said circular cutter to sever surplus lining material projecting from a finished edge of a shoe, and power-operated means extending downwardly through said hanger to drive said circular cutter.

2. A trimming machine comprising a frame having a stationary hanger the lower end of which is formed and arranged to hang in the forepart of a low shoe of which the counter-portion is held above the level of the throat of the vamp, a small circular shearing cutter mounted at the lower end of said hanger and arranged to rotate about a horizontal axis, a high-speed power-operated cutter arranged in shearing relation to said circular cutter to sever surplus lining material projecting from a finished edge of a shoe, and a power-driven shaft extending downwardly through said hanger to drive said circular cutter.

3. A trimming machine comprising a frame having a stationary hanger the lower end of which is formed and arranged to hang in the forepart of a high-heeled low shoe of which the counter-portion is held above the level of the throat of the vamp, a small circular shearing cutter mounted at the lower end of said hanger and arranged to rotate about a horizontal axis, and high-speed power-operated cutting mechanism including a reciprocatory cutter arranged in shearing relation to said circular cutter to sever surplus lining material projecting from a finished edge of a shoe, and power-driven means constructed and arranged to rotate said circular cutter at a controlled speed too slow for work-feeding purposes.

4. A trimming machine comprising a frame, a power-operated cutter mounted therein, a bowl-shaped oil-container detachably affixed to said frame, speed-reducing gearing arranged to run in oil in said container, an arm carried by and extending downwardly from said oil-container, a rotary cutter supported by the lower end of said arm in shearing relation to said power-operated cutter, and a shaft arranged in said arm to transmit rotation from said speed-reducing gearing to said rotary cutter.

5. A trimming machine comprising a hollow frame having an opening in its under side, a high-speed operating shaft arranged in said frame, a high-speed cutter operated by said shaft, a bowl-shaped member detachably affixed to the under side of said frame and closing said opening, speed-reducing gearing driven by said shaft but carried by said bowl-shaped member in the hollow thereof, an arm carried by and extending downwardly from said bowl-shaped member, a rotary cutter supported in shearing relation to said high-speed cutter by the lower end of said arm, and a shaft arranged in said arm to transmit rotation from said speed-reducing gearing to said rotary cutter.

GEORGE BOULTON.